（12）United States Patent
Sankaranarayanan

(10) Patent No.: US 12,524,861 B2
(45) Date of Patent: Jan. 13, 2026

(54) ON-DEVICE CONTENT-SPECIFIC MODEL ORCHESTRATION FOR OPTIMIZING USER-GENERATED CONTENT

(71) Applicant: Google LLC, Mountain View, CA (US)

(72) Inventor: Hari Bhaskar Sankaranarayanan, Karnataka (IN)

(73) Assignee: GOOGLE LLC, Mountain View, CA (US)

( * ) Notice: Subject to any disclaimer, the term of this patent is extended or adjusted under 35 U.S.C. 154(b) by 287 days.

(21) Appl. No.: 18/496,567

(22) Filed: Oct. 27, 2023

(65) Prior Publication Data

US 2025/0086767 A1 Mar. 13, 2025

(30) Foreign Application Priority Data

Sep. 8, 2023 (IN) .............................. 202321060504

(51) Int. Cl.
*G01C 21/36* (2006.01)
*G06N 20/00* (2019.01)
*G06T 7/00* (2017.01)

(52) U.S. Cl.
CPC ........ *G06T 7/0002* (2013.01); *G01C 21/3679* (2013.01); *G06N 20/00* (2019.01)

(58) Field of Classification Search
CPC ... G06T 7/0002; G01C 21/3679; G06N 20/00
See application file for complete search history.

(56) References Cited

U.S. PATENT DOCUMENTS 10,867,005 B1* 12/2020 Villiers ............... G06F 16/9574
2023/0052037 A1* 2/2023 Beaurepaire ....... G01C 21/3697

OTHER PUBLICATIONS erev0s.com, "3 ways for Dynamic Code Loading in Android", https://erev0s.com/blog/3-ways-for-dynamic-code-loading-in-android/, Feb. 21, 2023, Retrieved on Oct. 25, 2023, 6 pages.
cloud.google.com, "Introduction to Vertex AI Model Registry", https://cloud.google.com/vertex-ai/docs/model-registry/introduction, Retrieved on Oct. 25, 2023, 2 pages.

* cited by examiner

*Primary Examiner* — Juan M Guillermety
(74) *Attorney, Agent, or Firm* — DORITY & MANNING, P.A.

(57) ABSTRACT

User-generated content can be obtained from a user of a mapping application executed by the user computing device, wherein the user-generated content is associated with a particular Point of Interest (POI). A content-specific machine-learned model can be selected based on the user-generated content and/or a set of contextual information. The set of contextual information includes a location of the particular POI, information descriptive of the particular POI, and/or information descriptive of the user-generated content. The user-generated content can be processed with the first content-specific machine-learned model to obtain a quality metric. Based on the quality metric a determination can be made whether to provide the user-generated content to a server computing system associated with the mapping application.

20 Claims, 8 Drawing Sheets

ON-DEVICE CONTENT-SPECIFIC MODEL ORCHESTRATION FOR OPTIMIZING USER-GENERATED CONTENT

PRIORITY CLAIM

The present application is based on and claims priority to Indian Provisional Application 2023/21060504 having a filing date of Sep. 8, 2023, which is incorporated by reference herein.

FIELD

The present disclosure relates generally to orchestrating machine-learned models. More particularly, the present disclosure relates to orchestrating local on-device models for optimizing user-generated content.

BACKGROUND

Recent advancements in machine learning have been directed to large foundational models that can perform multiple tasks within a specific data domain. For example, Large Language Models (LLMs) are foundational models trained on large corpuses of textual content to perform multiple types of language tasks. However, such models require substantial quantities of compute resources during both training and inference. Furthermore, in some instances these models exhibit less performance than more tailored models trained to perform a specific task. For example, a foundational vision model may exhibit worse performance for a particular vision task than a smaller vision model trained specifically to perform the vision task.

Mobile computing technology has also seen substantial technological advancements. Specifically, in recent years, modern mobile devices (e.g., smartphones, tablets, wearables, etc.) have been developed with compute power that is sufficient to enable inference-stage processing with certain machine-learned models. To follow the previous example, a modern smartphone is unlikely to possess sufficient compute power to enable a foundational vision model. However, the smartphone is likely to possess sufficient compute power to enable a smaller vision model specifically trained to perform the vision task.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a user computing device comprising one or more processor devices, user-generated content from a user of an application executed by the user computing device, wherein the user-generated content is associated with a particular Point of Interest (POI). The method includes selecting, by the user computing device, a first content-specific machine-learned model of a plurality of content-specific machine-learned models based on the user-generated content and/or a set of contextual information, wherein the set of contextual information comprises at least one of a location of the particular POI, information descriptive of the particular POI, or information descriptive of the user-generated content. The method includes processing, by the user computing device, the user-generated content with the first content-specific machine-learned model to obtain a quality metric for the user-generated content. The method includes, based on the quality metric, making, by the user computing device, a determination whether to provide the user-generated content to a server computing system associated with the application.

Another example aspect of the present disclosure is directed to a user computing device. The user computing device includes one or more processing devices and one or more computer-readable media storing instructions that, when executed by the one or more processing devices, cause the one or more processing devices to perform operations. The operations include obtaining user-generated content from a user of an application executed by the user computing device, wherein the user-generated content is associated with a particular POI. The operations include selecting a first content-specific machine-learned model of a plurality of content-specific machine-learned models based on the user-generated content and/or a set of contextual information, wherein the set of contextual information comprises at least one of a location of the particular POI, information descriptive of the particular POI, or information descriptive of the user-generated content. The operations include processing the user-generated content with the first content-specific machine-learned model to obtain a quality metric for the user-generated content. The operations include, based on the quality metric, making a determination whether to provide the user-generated content to a server computing system associated with the application.

Another example aspect of the present disclosure is directed to one or more computer-readable media storing instructions that, when executed by one or more processing devices of a user computing device, cause the one or more processing devices to perform operations. The operations include obtaining user-generated content from a user of an application executed by the user computing device, wherein the user-generated content is associated with a particular POI. The operations include selecting a first content-specific machine-learned model of a plurality of content-specific machine-learned models based on the user-generated content and/or a set of contextual information, wherein the set of contextual information comprises at least one of a location of the particular POI, information descriptive of the particular POI, or information descriptive of the user-generated content. The operations include processing the user-generated content with the first content-specific machine-learned model to obtain a quality metric for the user-generated content. The operations include, based on the quality metric, making a determination whether to provide the user-generated content to a server computing system associated with the application.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
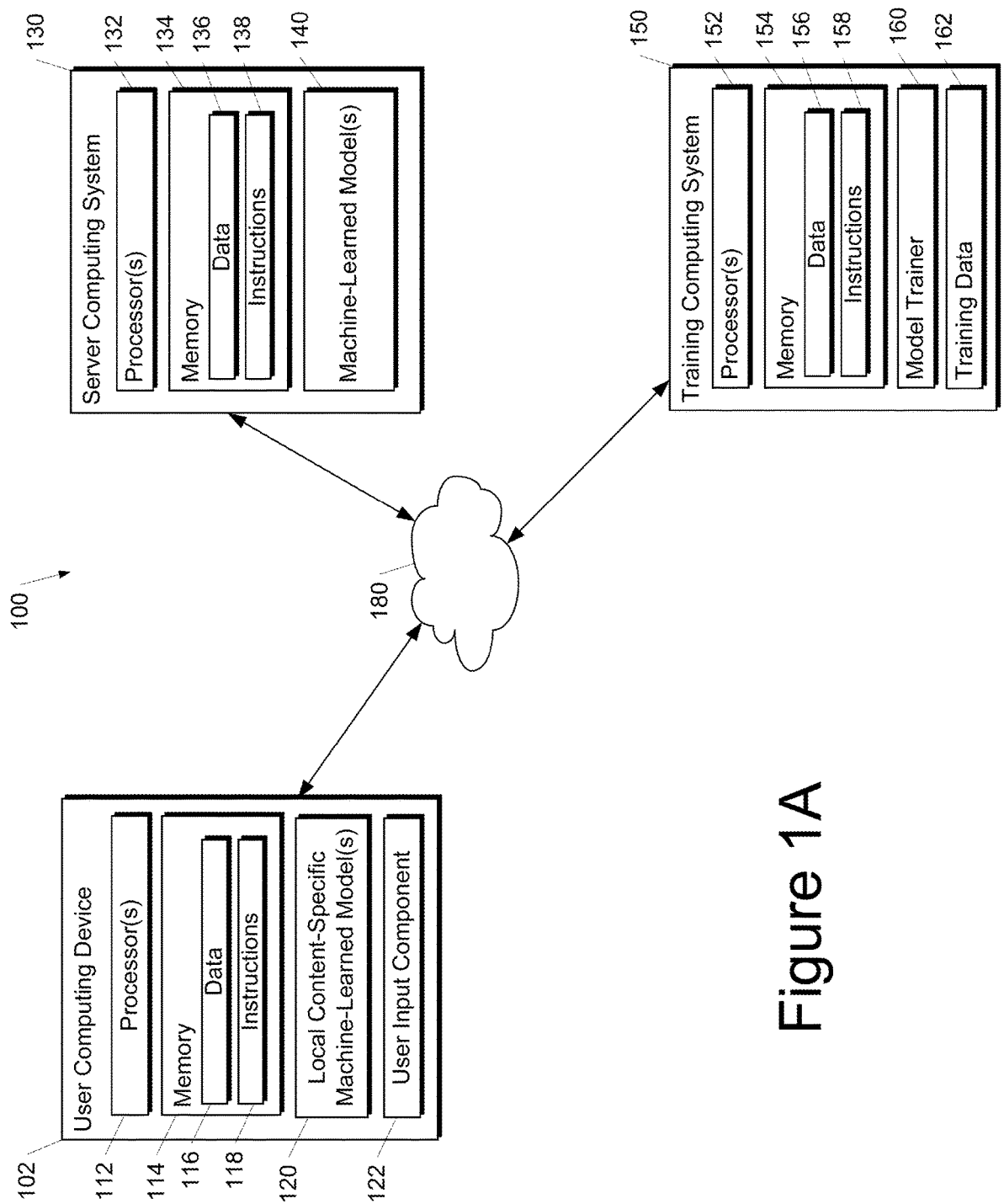
FIG. 1A depicts a block diagram of an example computing system that performs on-device content-specific model orchestration for optimizing user-generated content according to example embodiments of the present disclosure.

Reference numerals that are repeated across plural figures are intended to identify the same features in various implementations.

DETAILED DESCRIPTION

Overview

Generally, the present disclosure is directed to orchestrating machine-learned models. More particularly, the present disclosure relates to orchestrating lightweight, local on-device models for optimizing user-generated content. For example, assume that a user is utilizing a user computing device (e.g., smartphone, tablet, wearable device, laptop, etc.) to execute an application (e.g., a mapping application). The user can request navigation instructions to a particular Point of Interest (POI) via the application (e.g., a certain building, park, landmark, monument, etc.). Upon arrival at the POI, the user may create user-generated content, such as an image (e.g., an image depicting the POI or features of the POI), textual content (e.g., a review for the POI), video data (e.g., a recording of the POI), etc.

The user-generated content can be provided to a server computing system associated with the mapping service. Conventional mapping services aggregate user-generated content associated with POIs. This aggregated information can be provided to other users to assist the users in deciding whether to visit the POI. For example, a mapping application may aggregate images and reviews for a restaurant, and display the images and reviews to a user that searches for local movie theaters within the mapping application. In this manner, the user can make an informed decision whether to visit the restaurant.

However, some mapping services have large userbases with hundreds of millions of active users, which collectively upload large quantities of user-generated content. Curating this amount of user-generated content can be prohibitively difficult. As an example, for each image uploaded for a particular POI, the mapping service must analyze each image for relevance and quality, determine what is depicted in the image, label objects depicted in the image, etc. In addition, even the process of transmitting the image to the mapping service requires substantial bandwidth utilization. As such, any technique that reduces the processing required for user-generated content can provide substantial advantages.

Accordingly, implementations of the present disclosure propose on-device content-specific model orchestration for optimizing user-generated content. Specifically, due to advancements in processor technologies, recent user computing devices (e.g., a smartphone, tablet, etc.) often possess sufficient compute power to process user-generated content with machine-learned models that were previously utilized exclusively by server computing systems, such as those associated with mapping services. For example, a user computing device can obtain user-generated content from a user of a mapping application executed by the user computing device. The user-generated content can be associated with a particular POI. For example, the user-generated content can be an image depicting a restaurant, an image depicting a menu of the restaurant, etc.

The user computing device can select one of multiple content-specific machine-learned models based on a set of contextual information. The content-specific machine-learned model can be a model trained to process a particular type of user-generated content. For example, the content-specific machine-learned model can be trained to determine the quality of an image of the particular POI, or POIs of the same type as the particular POI (e.g., skyscrapers). The set of contextual information can include a location of the particular POI, information descriptive of the particular POI (e.g., a POI classification, historical information for the POI, etc.), information descriptive of the user-generated content (e.g., a classification output from a classifier model), etc.

In particular, the user computing device can utilize multiple content-specific machine-learned models that are trained to perform specific tasks related to user-generated content. For example, rather than utilizing a large foundational model, which can be computationally expensive, the user computing device can orchestrate the downloading, storing, loading, instantiating, unloading, etc. of multiple content-specific machine-learned model trained to perform specific tasks using substantially fewer computing resources than a foundational model. By orchestrating these content-specific machine-learned models, the user computing device can efficiently and accurately evaluate the quality of user-generated content.

The user computing device can process the user-generated content with the selected content-specific machine-learned model to obtain a quality metric for the user-generated content. Based on the quality metric, the user computing device can make a determination whether to provide the user-generated content to the server computing system associated with the mapping application. In such fashion, the user computing device can substantially reduce processing requirements for the server computing system of the mapping service by more efficiently utilizing on-device compute resources.

Aspects of the present disclosure provide a number of technical effects and benefits. As one example technical effect and benefit, implementations described herein can substantially reduce computing resource utilization by server computing systems of a mapping service by more efficiently utilizing existing computing resources of user computing devices in a distributed fashion. Specifically, cloud-based processing of all user-generated content provided by users of a mapping service can require the expenditure of enormous quantities of computing resources. However, by efficiently orchestrating on-device content-specific machine-learned models, implementations of the present disclosure can off-load such processing to the compute resources of user computing devices that would otherwise go unused, therefore substantially reducing the quantity of compute resources utilized by the server computing systems of the mapping service. Additionally, by locally evaluating quality, a user computing device can determine to refrain from sending an image with a "poor" quality to the server computing system rather than sending all images to the server computing system for evaluation. In this manner, implementations of the present disclosure can substantially reduce wireless network bandwidth utilization.

It should be noted that, although the present disclosure is discussed primarily with regards to a mapping application, implementations of the present disclosure can be utilized in accordance with a variety of other types of applications. For example, the application described herein may be, or otherwise include, a visual search application, navigation application, operating system feature(s), Augmented Reality (AR)/Virtual Reality (VR) application, etc.

With reference now to the Figures, example embodiments of the present disclosure will be discussed in further detail.

Example Devices and Systems

FIG. 1A depicts a block diagram of an example computing system 100 that performs on-device content-specific model orchestration for optimizing user-generated content according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include a plurality of content-specific machine-learned models 120. For example, the content-specific machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example content-specific machine-learned models 120 are discussed with reference to FIG. 2.

In some implementations, the content-specific machine-learned models 120 can be received from the server computing system 130 over network 180, stored in the user computing device memory 114, and then used or otherwise implemented by the one or more processors 112. In some implementations, the user computing device 102 can implement multiple parallel instances of a single content-specific machine-learned model 120 (e.g., to perform parallel processing of user-generated content across multiple instances of the content-specific machine-learned models 120).

More particularly, the content-specific machine-learned models 120 can be models trained to perform POI-related tasks. For example, one of the content-specific machine-learned models 120 may be trained to evaluate the quality of an image that depicts a skyscraper or similar building. For another example, one of the content-specific machine-learned models 120 can be a model trained to evaluate the quality of a text-based review for the POI. For yet another example, one of the content-specific machine-learned models 120 can be a model trained to optimize the quality of a particular type of user-generated content (e.g., removing inappropriate or unrelated content from an image, upscaling the resolution of an image, revising a written review, etc.).

Additionally, or alternatively, one or more machine-learned models 140 can be included in or otherwise stored and implemented by the server computing system 130 that communicates with the user computing device 102 according to a client-server relationship. For example, the machine-learned models 140 can be machine-learned models 140 that are implemented by the server computing system 130 as a portion of a web service (e.g., a mapping service). Thus, one or more models 120 can be stored and implemented at the user computing device 102 and/or one or more models 140 can be stored and implemented at the server computing system 130.

Specifically, in some implementations, the server computing system 130 can train, or otherwise generate, the content-specific machine-learned models 120 based on the machine-learned models 140. Specifically, in some implementations, the server computing system 130 can create the content-specific machine-learned models 120 via distillation training from the machine-learned models 140. For example, the content-specific machine-learned model 120 can be a lightweight model trained to evaluate the quality of particular types of POIs, and may be trained via distillation training from a more computationally complex machine-learned model 140 of the server computing system 130. For another example, the server computing system 130 can include multimodal machine-learned models, such as foundational models, that are used to train the content-specific machine-learned models 120 via distillation training (e.g., distillation training from a foundational vision model by processing images of the type of POI with the foundational vision model).

Additionally, or alternatively, in some implementations, the server computing system 130 can create, train, and/or update the content-specific machine-learned models 120 in a federated manner. For example, for a number of iterations, user computing devices such as the user computing device 102 can process user-generated content and determine a quality metric for the user generated content. The user computing devices can provide the user-generated content and the associated quality metrics to the server computing system 130. The server computing system 130 can re-evaluate the quality of the user-generated content with the machine-learned models 140 to determine the accuracy of the content-specific machine-learned models 120. Based on differences between the quality metrics generated by the content-specific machine-learned models 120 and the machine-learned models 140, the server computing system 130 can determine a model update, and can transmit information indicative of the model update to each of the user computing devices. In such fashion, the server computing system 130 can efficiently optimize the content-specific machine-learned models 120 in a federated manner.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, content-specific training examples related to particular POIs or types of POIs, such as images of POIs, images of content related to POIs (e.g., menus, informational materials, etc.), videos of POIs, textual content associated with POIs, etc.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
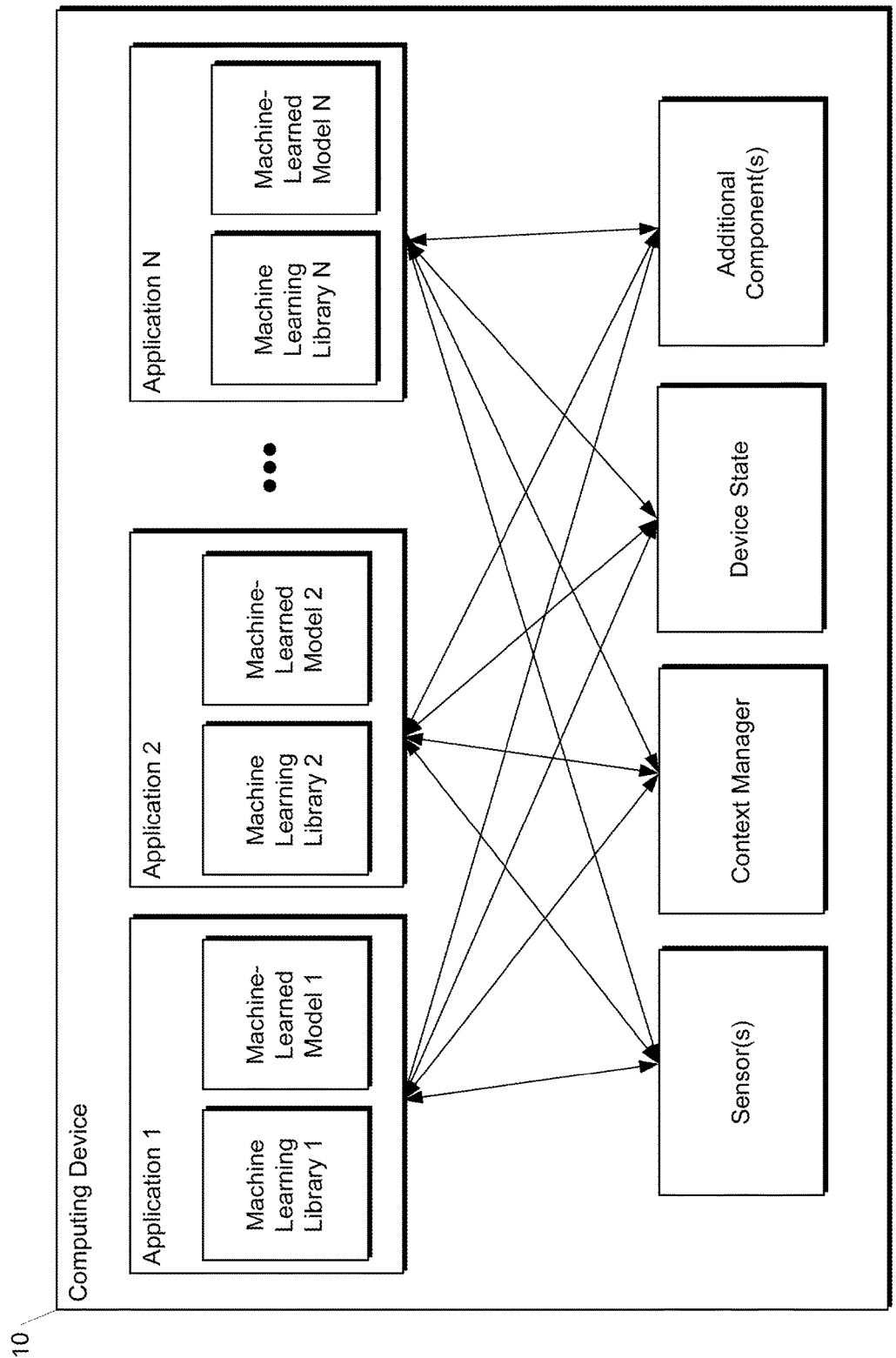
FIG. 1B depicts a block diagram of an example computing device that performs on-device content-specific model orchestration for optimizing user-generated content according to example embodiments of the present disclosure.

FIG. 1B depicts a block diagram of an example computing device 10 that performs on-device content-specific model orchestration for optimizing user-generated content according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
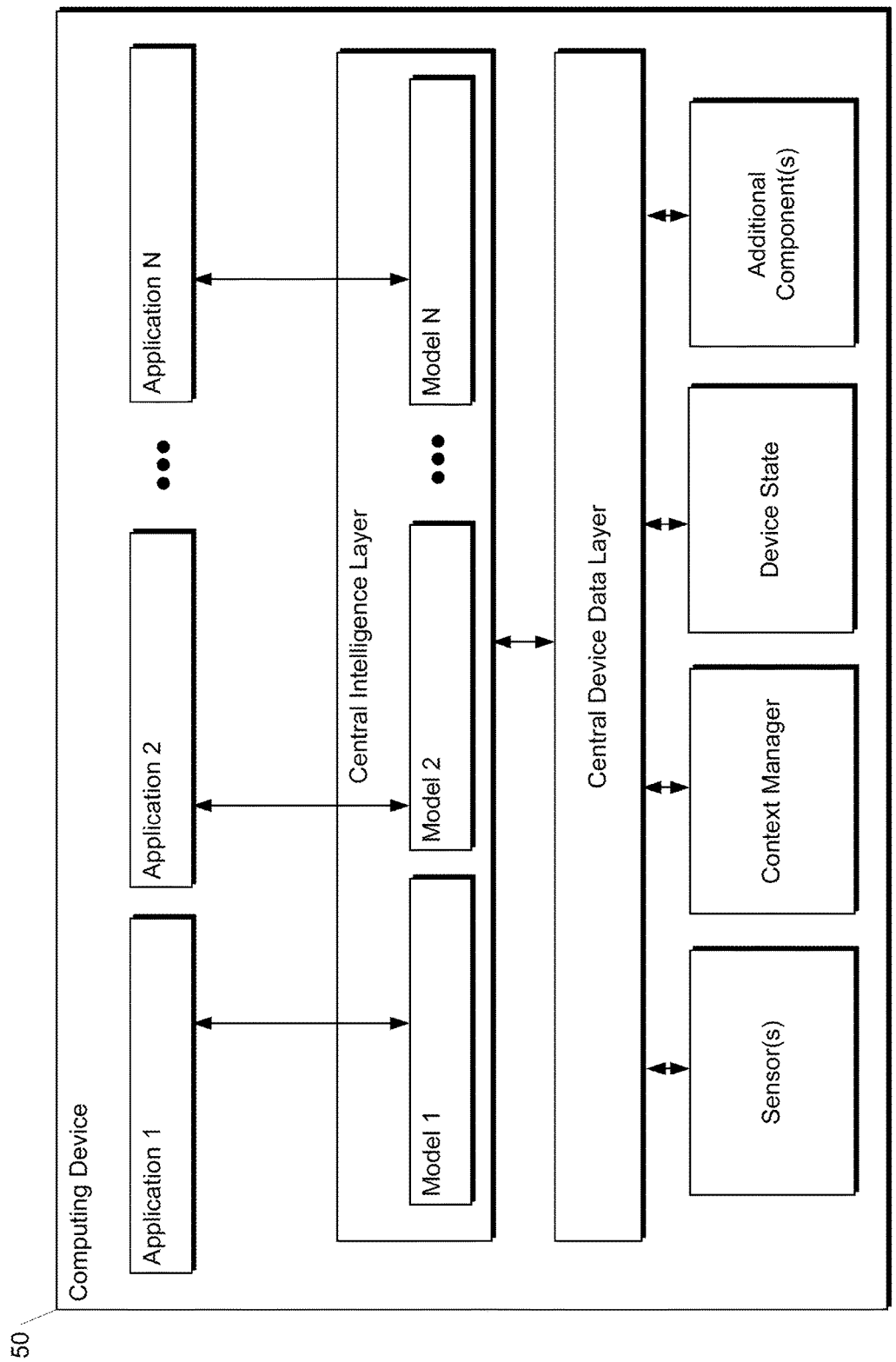
FIG. 1C depicts a block diagram of an example computing device that performs training of content-specific machine-learned models for processing user-generated content according to example embodiments of the present disclosure.

FIG. 1C depicts a block diagram of an example computing device 50 that performs training of content-specific machine-learned models for processing user-generated content according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
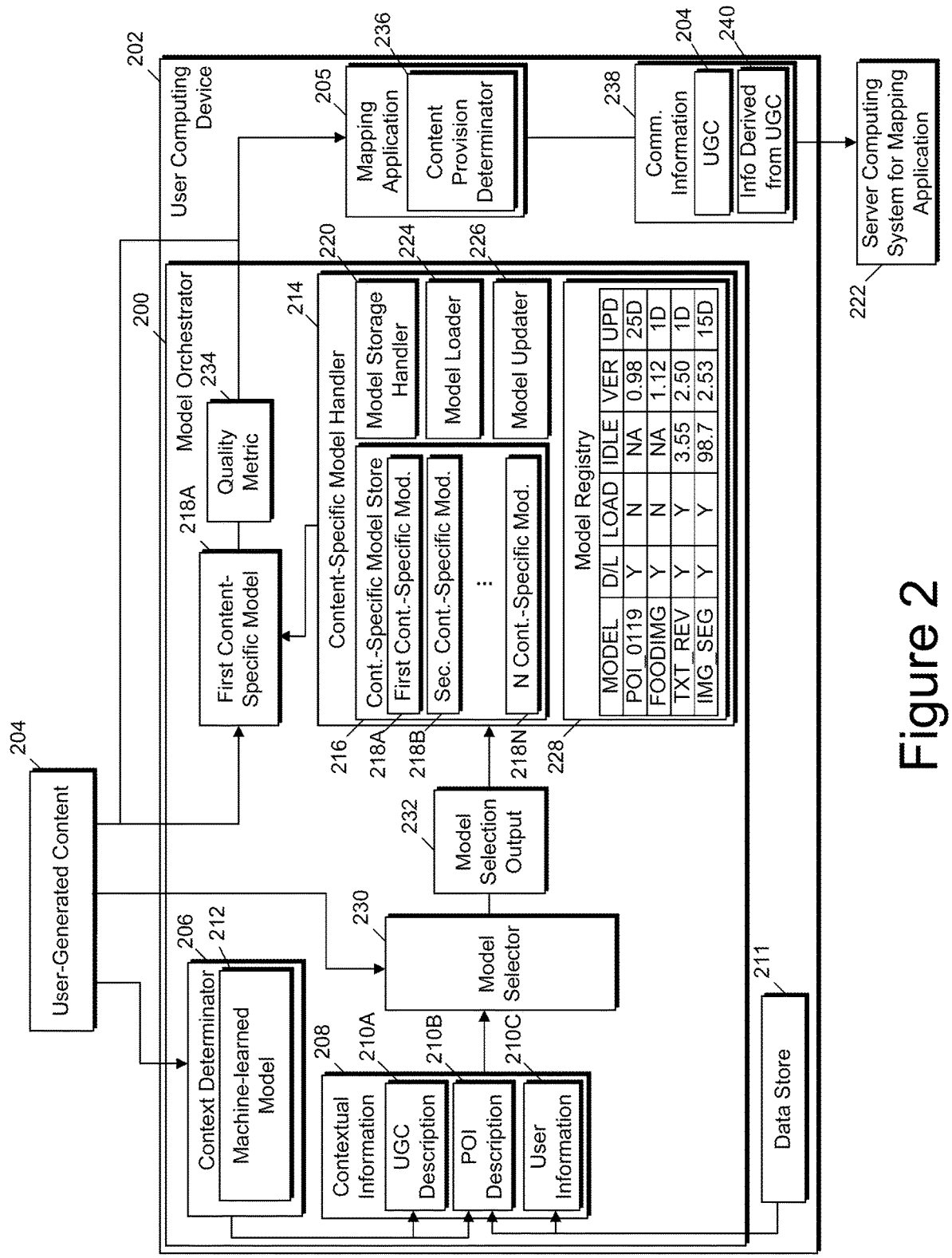
FIG. 2 is a data flow diagram for a model orchestrator of a user computing device 202 according to some implementations of the present disclosure.

FIG. 2 is a data flow diagram for a model orchestrator 200 of a user computing device 202 according to some implementations of the present disclosure. The user computing device 202 can be any type or manner of user computing device, such as the user computing device 102 of FIG. 1A (e.g., a smartphone, tablet, laptop, desktop, wearable device, Augmented Reality (AR)/Virtual Reality (VR) device, etc.). The user computing device 202 can include a model orchestrator 200. The model orchestrator 200 can orchestrate utilization of multiple content-specific machine-learned models for processing user-generated content 204.

In particular, the user computing device 202 can obtain user-generated content 204. The user-generated content 204 can be any type or manner of content generated by a user of the user computing device 204. In some implementations, the user-generated content 204 can be captured via an input device of the user computing device 202. For example, the user-generated content 204 can be an image captured with an image capture device of the user computing device 202. For another example, the user-generated content 204 can be textual content generated using a touch input device of the user computing device 202 (e.g., a touchscreen, a keyboard, a microphone in association with speech-to-text conversion, etc.). Additionally, or alternatively, in some implementations, the user-generated content 204 can be content obtained via an input device, or a computing device, that is communicatively connected to the user computing device 202. For example, the user-generated content 204 can be captured via a wearable device of the user and can be transmitted to the user computing device 202.

The user-generated content 204 can be associated with a particular POI. A POI can refer to any discrete entity that can be navigated to via a mapping application, such as a building, restaurant, business, residential location, park, geographic area, neighborhood, monument, etc. In some implementations, a POI may refer to a temporary entity such as a concert, pop-up location, parade, etc. In some implementations, a POI may refer to a virtual POI, such as a virtual representation of a corresponding "real" location, or a fictional location within a virtual environment.

The user-generated content 204 can be associated with the POI by depicting the POI, depicting materials related to the POI, describing the POI, or otherwise indicating some content related to the POI. For example, if the user-generated content 204 is an image, they image may be an image that depicts the POI, depicts an advertisement of the POI, depicts materials related to the POI (e.g., menu of a restaurant, floor plan of a building, a sign for a business indicating business hours, etc.). For another example, if the user-generated content 204 is textual content, the textual content could describe a review for the business, information related to the POI (e.g., a cost for attendance, hours, an address, instructions for accessing the POI, etc.), etc.

In some implementations, the user-generated content 204 can be provided via an interface of mapping application 205. The mapping application 205 can be an application associated with a mapping service that provides map-related services, such as routing and navigation instructions. For example, the mapping application 205 can be executed by the user computing device 202 so that the user of the user computing device 202 can request instructions to navigate to the particular POI. The user can access the mapping application 205 an interface element for the POI within the mapping application 205 that includes reviews, images, and other user-generated content associated with the POI. To provide the user-generated content 204, the user may select an interface element requesting that the user provides user-generated content for the POI. For example, the interface element may include the words "Write a review" or similar. For another example, the interface element may be an icon of a camera, or the words "submit images of the POI" or similar. If the user provides the user-generated content 204 via the mapping application, the model orchestrator 200 can automatically identify that the user-generated content 204 is associated with the particular POI.

The model orchestrator 200 can evaluate the user-generated content 204 with a context determinator 206. The context determinator 206 can generate contextual information 208. Contextual information 208 can include information related to the user-generated content 204, the POI, the user of the user computing device 202, circumstances during which the user-generated content 204 was captured, etc. In particular, the contextual information 208 can include user-generated information 210A. The user-generated content information 210A can be information descriptive of the user-generated content 204, such as a classification of the user-generated content 204, a description of the user-generated content 204, object recognition labels for objects depicted in the user-generated content 204, etc. In some implementations, the user-generated content information 210A can be a model output from a model trained to perform an initial analysis of the user-generated content 204. For example, the context determinator can include a machine-learned model 212. The machine-learned model 212 can be trained to process the user-generated content 204 and generate a model output that classifies the user-generated content 204.

In some implementations, the user-generated content information 210A can describe environmental characteristics for the time and/or location at which the user-generated content 204 was captured. For example, if the user-generated content 204 is an image that depicts the POI, the user-generated content information 210A may include, or otherwise indicate, coordinates from which the image was captured, camera capture parameters, a type of image capture device utilized, a time of day at which the image was captured, a vector corresponding to the angle of capture, etc.

Additionally, or alternatively, in some implementations, the contextual information 208 can include POI information 210B. The POI information 210B can describe certain characteristics of the POI, such as an identity of the POI, a location of the POI, etc. For example, the user-generated content 204 may not fully identify the POI, such as an image captured in a large city that includes the POI and additional nearby buildings. The context determinator 206 can process the user-generated content 204 with the machine-learned model 212 to obtain a model output. The model output can indicate the primary subject of interest of the image (e.g., the POI) and can further indicate an identity of the POI.

Additionally, or alternatively, in some implementations, the contextual information 208 can include user information 210C. The user information 210C can include information descriptive of the user of the user computing device 202. For example, the user information 210C can include previous quality metrics associated with user-generated content from the user, historical user preferences, etc.

The model orchestrator 200 can obtain the user information 210C from a data store 211 maintained by the user computing device 202. In some implementations, the model orchestrator can at least partially obtain the POI information 210B from the data store 211.

The model orchestrator 200 can include a content-specific model handler 214. The content-specific model handler 214 can store models, download models, load models, and otherwise perform tasks for implementing content-specific machine-learned models. To do so, the content-specific model handler 214 can include a content-specific model store 216. The content-specific model store 216 can store content-specific machine-learned models 218A-218N (generally, content-specific machine-learned models 218) at a local storage device of the user computing device 202. The content-specific machine-learned models 218 can include content-specific models for particular types of user-generated content, and/or for particular types of POIs. For example, the content-specific model store 216 can include models for quality evaluation for images, text, audio, video, user-generated assets, etc.

The content-specific machine-learned models 218 stored by the content-specific model store 216 can be trained to evaluate the quality of such user-generated content for a particular POI, a particular type of POI, or for all types of POIs. For example, the first content-specific machine-learned model 218A can be a model trained to evaluate images of national monuments, while the second content-specific machine-learned model 218B can be a model trained to evaluate the quality of reviews for any type of POI.

To handle the content-specific machine-learned models 218 stored by the content-specific model store 216, the content-specific model handler 214 can include a model storage handler 220. The model storage handler 220 can download content-specific machine-learned models 218 for storage at the content-specific model store 216. For example, the model storage handler 220 can receive instructions from the content-specific model handler to download a particular type of content-specific machine-learned model 218. The model storage handler 220 can request the model from a server computing system 222 associated with the mapping application 205. The server computing system 222 can provide the content-specific machine-learned model 218 to the model storage handler 220 for storage.

Based on available local storage resources, the model storage handler 220 can remove one or more of the content-specific machine-learned models 218 from the content-specific model store 216. For example, assume that the model storage handler 220 receives instructions to request and store content-specific machine-learned model 218N, but the content-specific model store 216 does not have access to a necessary quantity of storage space on local storage devices. The model storage handler 220 can remove one or more content-specific machine-learned models 218 based on the last time the models were loaded (e.g., to prioritize removing models that are least likely to be used in the future).

The content-specific model handler 214 can include a model loader 224. The model loader 224 can load content-specific machine-learned models 218 into active memory for utilization. For example, the model loader 224 can receive instructions to load the first content-specific machine-learned model 218A from the content-specific model handler 214. In response, the model loader 224 can instantiate an instance of the first content-specific machine-learned model 218A in local memory of the user computing device 202. Once instantiated, the model can be utilized to process the user-generated content 204.

The content-specific model handler 214 can include a model updater 226. The model updater 226 can update the content-specific machine-learned models 218. For example, assume that the content-specific machine-learned models 218 are obtained from the server computing system 222 for the mapping application 205. The server computing system 222 can iteratively update and optimize machine-learned models via a training process and/or fine tuning process.

The training process can, in some implementations, be federated. For example, assume that the first content-specific machine-learned model 218A processes the user-generated content 204 to obtain a quality metric. The user computing device 202 can provide both the user-generated content 204 and the quality metric to the server computing system 222. The server computing system 222 can process the user-generated content 204 with a model instance to obtain another quality metric. The server computing system can evaluate the difference between the two quality metrics with a loss function to calculate a model update for the first content-specific machine-learned model 218A. The server computing system 222 can provide the model update to the user computing device 202, and to any additional user computing devices 202 served by the server computing system 222. The model updater 226 can apply the model update to the first content-specific machine-learned model 218A. In such fashion, the model updater 226 can apply model updates to the content-specific machine-learned models 218 that are determined in a federated manner.

Additionally, or alternatively, in some implementations, the model updater 226 can apply model updates to the content-specific machine-learned models 218 to perform distillation training. To follow the previous example, assume that the model instance utilized by the server computing system 222 is a model instance of a foundational vision model trained to perform multiple vision tasks. The foundational vision model may exhibit analogous, or superior, performance to the first content-specific machine-learned model 218A. As such, by applying the model update to the first content-specific machine-learned model 218A, the model updater can distill the performance of the foundational vision model to the first content-specific machine-learned model 218A.

The content-specific model handler 214 can include a model registry 228. The model registry 228 can include information descriptive of current and previous states of each of the content-specific machine-learned models 218. To follow the depicted example, the information maintained in the model registry 228 can indicate a model identifier (e.g., POI_0119), whether the model is downloaded and stored (e.g., D/L: Y or N), whether the model is loaded to active memory (e.g., LOAD: Y or N), a quantity of time the model has been idle (e.g., hours since last use), a current version indicator for the model (e.g., VER: 1.12), and a quantity of time since the model was last updated (e.g., UPD: 25D). More generally, the model registry can maintain information describing any characteristic or performance metric for each of the content-specific machine-learned models 218.

The model orchestrator 200 can include a model selector 230. The model selector 230 can be a module (e.g., collection of hardware and/or software resources) that processes the contextual information, and/or the user-generated content 204, to generate a model selection output 232. The model selection output 232 selects one, or more, of the content-specific machine-learned models 218 for utilization in processing the user-generated content 204. In some implementations, the model selector 230 can generate the model selection output 232 based at least in part on whether the user-generated content 204 has previously been evaluated for quality. In these instances, the model selector 230 can additionally evaluate a quality metric generated for the user-generated content 204.

For example, assume that the user-generated content 204 is processed with one of the content-specific machine-learned models 218 to obtain a quality metric. The quality metric can indicate that the quality of the user-generated content is insufficient for provision to the server computing system 222. The quality metric can further indicate characteristics of the user-generated content 204 that were detrimental to the corresponding quality metric. For example, if the user-generated content 204 is a "selfie" image, the quality metric may indicate that the depiction of the user in the image is overly prominent. For another example, if the user-generated content 204 is an image that depicts a POI, the quality metric may indicate that the POI is off-center in the image.

If the characteristics of the user-generated content 204 indicated by the quality metric to be detrimental can be remedied by one of the content-specific machine-learned models 218, the model selector 230 can select that model via the model selection output 232. To follow the previous example, one of the content-specific machine-learned models 218 can be a model trained to re-center depictions of POIs in off-center images. The model selector 230 can select that particular content-specific machine-learned model 218 to optimize the quality of the user-generated content 204. In this manner, the quality of user-generated content 204 can be optimized prior to transmission to the server computing system 222, therefore further reducing processing load at the server computing system 222.

The content-specific model handler 214 can instantiate an instance of the first content-specific machine-learned model 218A based on the model selection output 232. The model orchestrator 200 can process the user-generated content 204 with the first content-specific machine-learned model 218A to obtain a quality metric 234. As described previously, the quality metric 234 can indicate a "quality" of the user-generated content 204. Additionally, in some implementations, the quality metric 234 can indicate characteristics of the user-generated content 204 that contributed beneficially to the quality metric 234 and those that contributed detrimentally to the quality metric 234. For example, assume that the user-generated content 204 is an image depicting a POI (e.g., a skyscraper). The quality metric 234 may indicate that the quality of the resolution and focus of the image is high, but may also indicate that the relevance of the image is low due to the number of additional buildings featured in the image.

In some implementations, the quality metric 234 can be a numerical value representing the overall quality of the user-generated content 204. Additionally, or alternatively, in some implementations, the quality metric 234 can include information descriptive of certain aspects or characteristics of the user-generated content 204. To follow the previous example, the quality metric 234 may label the POI and any additional buildings depicted in the image. This information can be generated via processing the user-generated content 204 with the first content-specific machine-learned model 218A, and/or can be information from the contextual information 208.

The model orchestrator 200 can provide the user-generated content 204 and the quality metric 234 to the mapping application 205. The mapping application 205 can include a content provision determinator 236. The content provision determinator 236 can determine whether to provide the user-generated content 204 to the server computing system 222 for the mapping application 205. The content provision determinator 236 can make this determination based on the quality metric 234 and the user-generated content 204. For example, if the quality metric 234 is greater or equal to a quality threshold, the content provision determinator 236 can determine to provide the user-generated content 204. For another example, if the quality metric 234 is lower or equal to the quality threshold, the content provision determinator 236 can determine to refrain from providing the user-generated content 204.

In some implementations, the content provision determinator 236 can make the determination whether to provide the user-generated content 204 based on additional information included in the quality metric 234. For example, assume that the quality metric 234 is substantially higher than a quality threshold. Further assume that the quality metric 234 includes information indicating that the user-generated content 204 depicts a person wearing a T-shirt with an inappropriate message. The content provision determinator 236 can determine whether the inappropriate message is sufficiently inappropriate to refrain from providing the user-generated content 204 to the server computing system 222.

For another example, assume that the quality metric 234 is substantially higher than the quality threshold and that the quality metric 234 includes information indicating that the user-generated content 204 depicts the POI from the same perspective as multiple other images already provided to the server computing system 222. The content provision determinator 236 can determine whether the redundancy of the user-generated content 204 is sufficiently great as to refrain from providing the user-generated content 204 to the server computing system 222. For yet another example, assume that the quality metric 234 is substantially higher than the quality threshold and that the quality metric 234 includes information indicating that the user-generated content 204 depicts the POI at a time that does not correspond to the most popular times at which the POI is visited by users (e.g., an image of a nightclub captured at noon, an image of an empty stadium in the morning, etc.). The content provision determinator 236 can determine whether the lack of temporal relevance of the user-generated content 204 is sufficiently great as to refrain from providing the user-generated content 204 to the server computing system 222.

In some implementations, the content provision determinator 236 can interface with the server computing system 222 to determine whether to provide the user-generated content 204 to the server computing system 222. To follow the previous example, the content provision determinator 236 can indicate to the server computing system 222 that the user-generated content 204 lacks temporal relevance, or may just indicate to the server computing system 222 the time at which the user-generated content 204 was captured. If the server computing system 222 determines that such an image is beneficial, the server computing system 222 can respond by requesting the content provision determinator 236 provide the user-generated content.

If the content provision determinator 236 determines to provide the user-generated content 204, the user computing device 202 can generate communication information 238 (e.g., via the mapping application, etc.). The communication information 238 can include the user-generated content 204, or can otherwise include information derived from the user-generated content 204. For example, if the user-generated content 204 is an image, the communication information 238 can include a compressed representation of the user-generated content 204, a portion of the user-generated content 204 (e.g., a relevant portion of the image, etc.), an encoding that can be processed at the server computing system to reconstruct the user-generated content 204, etc. The user computing device 202 can provide the communication information to the server computing system 222.

Figure 3A:
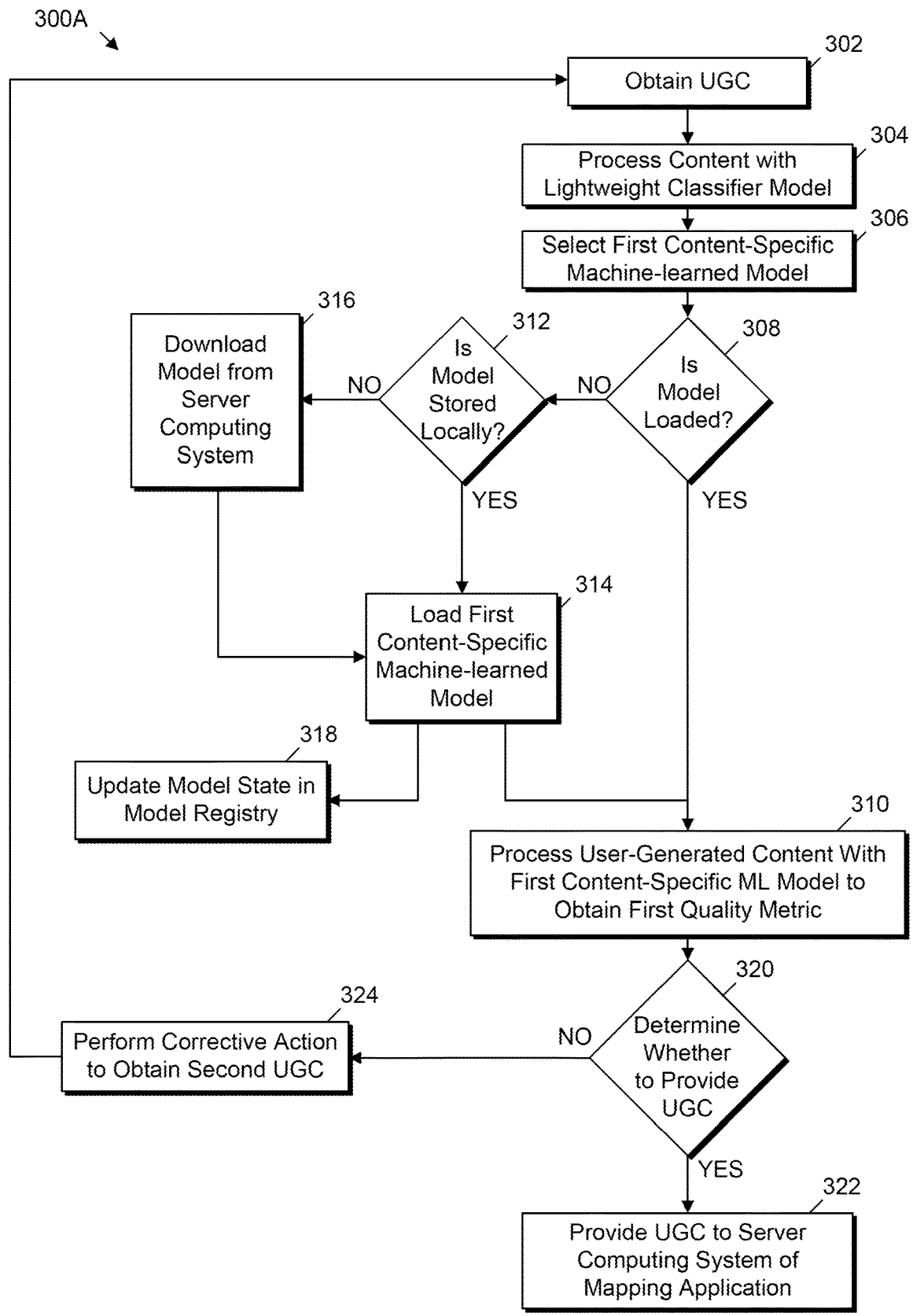
FIG. 3A is a flowchart for a method for determining whether to provide user-generated content via orchestration of on-device content-specific machine-learned models according to some implementations of the present disclosure.

FIG. 3A is a flowchart for a method 300A for determining whether to provide user-generated content via orchestration of on-device content-specific machine-learned models according to some implementations of the present disclosure. Although FIG. 3A depicts steps performed in a particular order for purposes of illustration and discussion, the methods of the present disclosure are not limited to the particularly illustrated order or arrangement. The various steps of the method 300A can be omitted, rearranged, combined, and/or adapted in various ways without deviating from the scope of the present disclosure.

At 302, a user computing device can obtain user-generated content from a user of a mapping application executed by the user computing device. The user-generated content can be associated with a particular POI.

At 304, the user computing device can, in some implementations, process the user-generated content with a light-weight classifier model to obtain a model output. The model output can classify the user-generated content. For example, the model output may identify the POI associated with the user-generated content. For another example, the model output may label objects recognized in the user-generated content. For yet another example, the model output may further classify the user-generated content as a type of content (e.g., a "selfie" image, a panoramic image, an image of a menu, an image of a certain portion of a POI, etc.).

At 306, the user computing device can select a first content-specific machine-learned model of a plurality of content-specific machine-learned models based on the user-generated content and/or a set of contextual information. The set of contextual information can include at least one of a location of the particular POI, information descriptive of the particular POI, and/or information descriptive of the user-generated content.

At 308, the user computing device can determine whether the first content-specific machine-learned model is loaded to active memory.

If the user computing device determines that the first content-specific machine-learned model is loaded to active memory, the user computing device can continue to 310 to process the user-generated content with the first content-specific machine-learned model to obtain a first quality metric.

Alternatively, if the user computing device determines that the first content-specific machine-learned model is not loaded to active memory, the user computing device can, at 312, determine whether the first content-specific machine-learned model is stored locally on a local storage device associated with the user computing device.

If the user computing device determines that the first content-specific machine-learned model is stored locally on a local storage device associated with the user computing device, the user computing device can continue to 314 to load the first content-specific machine-learned model to active memory.

Alternatively, if the user computing device determines that the first content-specific machine-learned model is not stored locally on the local storage device associated with the user computing device, the user computing device can continue to 316 to download the first content-specific machine-learned model from the server computing system associated with the mapping application and can store the model to the local storage device. The user computing device can then proceed to step 314 to load the first content-specific machine-learned model to active memory.

At 318, the user computing device can update a model state in a model registry if the user computing device proceeded to 312 to download the model from the server computing system and store the model to local storage, and/or proceeded to 314 to load the first content-specific machine-learned model to active memory. For example, the user computing device can modify a status associated with the first content-specific machine-learned model to indicate that the model is now stored locally and is now loaded to active memory as described with regards to the model registry 228 of FIG. 2.

Once the first content-specific machine-learned model is loaded to active memory, at 310, the user computing device can process the user-generated content to obtain a first quality metric.

At 320, the user computing device can determine whether to provide the user-generated content to the server computing system based on the first quality metric. For example, the user computing device may determine to provide the user-generated content if the first quality metric is above a quality threshold, and may determine to refrain from providing the user-generated content if the first quality metric is below a quality threshold.

At 322, if the user computing device determines to provide the user-generated content, the user computing device can provide the user-generated content to the server computing system associated with the mapping application.

At 324, the user computing device can, in some implementations, perform a corrective action to obtain second user-generated content if the user computing device determines to refrain from providing the user-generated content at 320. Performing a corrective action will be discussed in greater detail with regards to FIG. 3B.

Figure 3B:
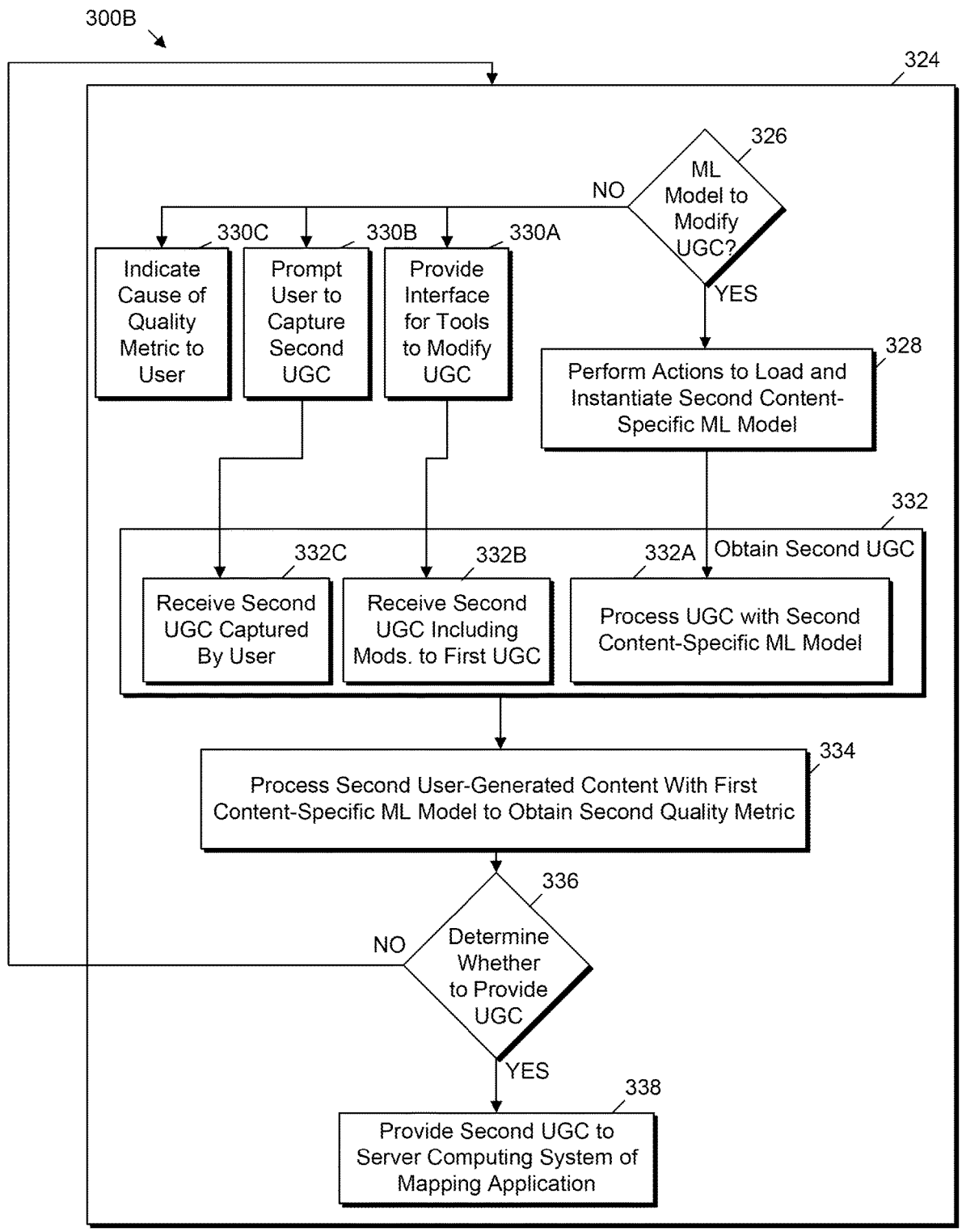
FIG. 3B is a flowchart for a method for performing a corrective action to obtain second user-generated content via orchestration of on-device content-specific machine-learned models according to some implementations of the present disclosure.

FIG. 3B is a flowchart for a method 300B for performing a corrective action to obtain second user-generated content via orchestration of on-device content-specific machine-learned models according to some implementations of the present disclosure. The method 300B of FIG. 3B is discussed in conjunction with the method 300A of FIG. 3A. Although FIG. 3B depicts steps performed in a particular order for purposes of illustration and discussion, the methods of the present disclosure are not limited to the particularly illustrated order or arrangement. The various steps of the method 300B can be omitted, rearranged, combined, and/or adapted in various ways without deviating from the scope of the present disclosure.

As described previously, the user computing device can perform a corrective action at 324 to obtain second user-generated content. To perform the corrective action, at 326, the user computing device can determine whether a second content-specific machine-learned model of the plurality of content-specific machine-learned models can be utilized to optimize the first user-generated content obtained at operation 302 of FIG. 3A. For example, the quality metric generated at operation 310 of FIG. 3A can indicate that the quality of the user-generated content is high, but that the user-generated content depicts a person wearing a T-shirt with an inappropriate message. The user-computing device can determine whether a second content-specific machine-learned model of the plurality of content-specific machine-learned models is trained to remove such inappropriate content from images.

At 328, the user computing device can perform actions to load and instantiate the second content-specific machine-learned model if the second content-specific machine-learned model is trained to optimize the user-generated content.

Alternatively, if none of the content-specific machine-learned models are trained to optimize the user-generated content, the computing system can proceed to perform one or more of operations 330A, 330B, or 330C.

At 330A, the user computing device can provide an interface for tools to modify the user-generated content. More specifically, the mapping application, the operating system of the user computing device, and/or other applications of the user computing device can be or otherwise include tools that can be utilized by the user to modify user-generated content. For example, the mapping application may include a cropping tool to crop away irrelevant portions of an image. For another example, the mapping application or another application of the user computing device may include a machine-learned model (e.g., a content-specific machine-learned model) that can perform image upscaling to increase the visual fidelity of the user-generated content. For yet another example, the mapping application or another application of the user computing device may include suite of image editing tools that allow substantial editing of the user-generated content (e.g., tools used to remove persons from an image, change the coloring of an image, blur an inappropriate depiction, etc.).

At 330B, the user computing device can prompt the user to capture second user-generated content. For example, assume that the user-generated content is an image depicting the POI, and that the quality metric generated at operation 310 of FIG. 3A indicates that the image lacks sufficient quality for provision to the server computing system (e.g., too blurry, etc.). The user computing device can prompt the user (e.g., via the mapping application, etc.) to capture another image to serve as second user-generated content.

At 330C, the user computing device can indicate characteristics of the user-generated content that primarily influenced the quality metric. To follow the previous example, if the user-generated content is an image that is too blurry, the user computing device can indicate a lack of visual fidelity as the main characteristic contributing to the quality metric. For another example, if the user-generated content is an image that does not depict the entirety of a POI (e.g., only the bottom half of a large building, etc.), the user computing device can indicate an incomplete capture of the subject as the main characteristic contributing to the quality metric. In this manner, the user computing device can increase the likelihood that the second user-generated content remedies the detrimental characteristics of the first user-generated content.

Figure 4:
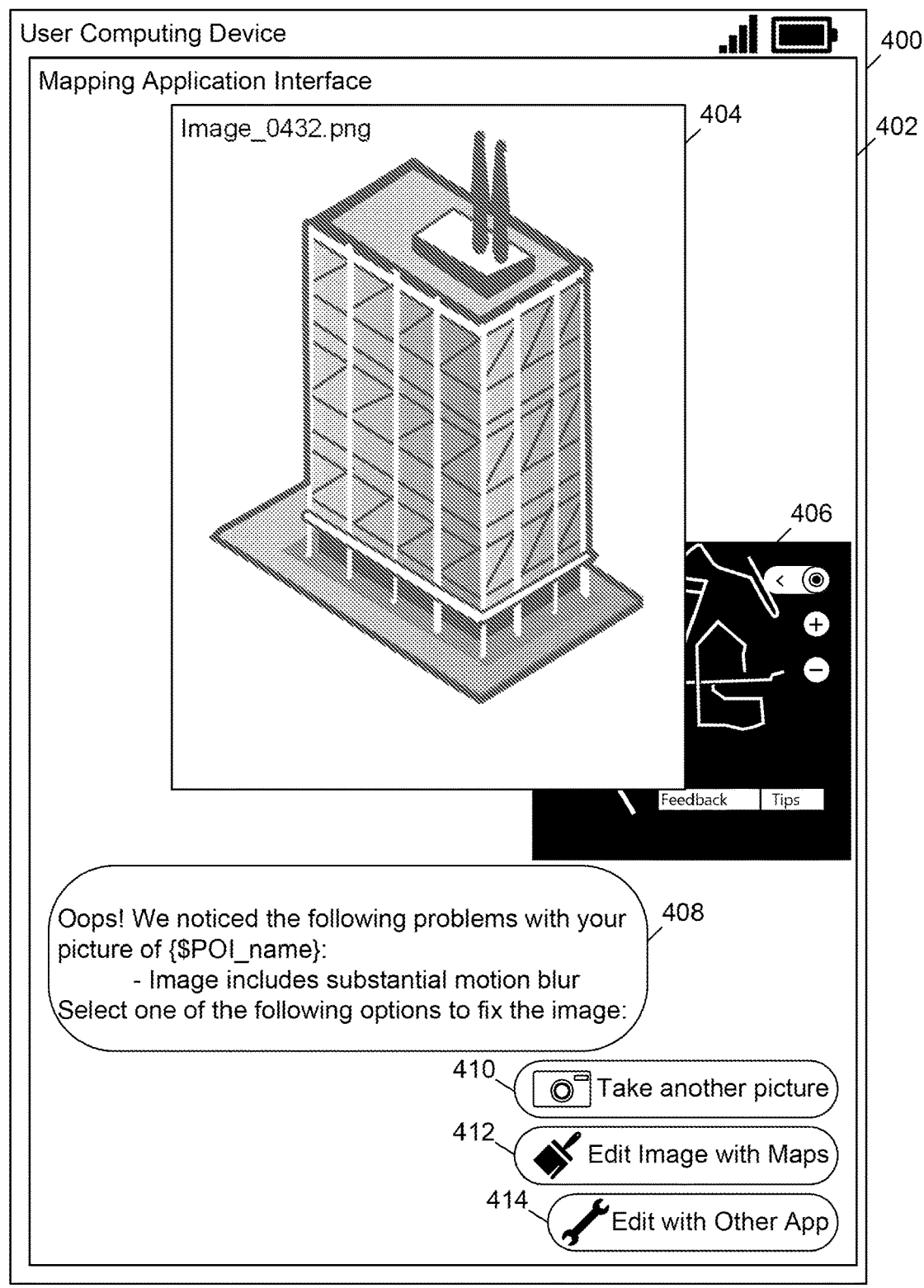
FIG. 4 depicts an example interface of a mapping application that performs operations described with regards to FIG. 3B according to some implementations of the present disclosure.

Turning to FIG. 4, FIG. 4 depicts an example interface of a mapping application that performs the operations 330A, 330B, and 330C described with regards to FIG. 3B according to some implementations of the present disclosure. More specifically, a user computing device 400 can execute a mapping application. The mapping application can display an interface 402. The interface 402 can include an interface element with user-generated content 404. As depicted, the user-generated content 404 can be an image of a POI (e.g., a large building). The interface 402 can also include a map 406 to enable provision of navigation instructions, exploration of nearby POIs, etc.

Assume that the user-generated content 404 is processed with a first content-specific machine-learned model to obtain a quality metric as described with regards to operation 310 of FIG. 3A, and that the quality metric indicates a lack of visual fidelity for the user-generated content. As described with regards to operation 330C of FIG. 3B, the mapping application can provide causal information 408 indicating a cause of the quality metric. To follow the depicted example, the causal information 408 can indicate to the user that the user-generated content 404 is too blurry.

As described with regards to operations 330B and 330A of FIG. 3B, the mapping application can prompt the user to perform corrective actions to generate second user-generated content. To follow the depicted example, the mapping application can display a capture interface element 410 that prompts the user to capture another image. If the capture interface element 410 is selected, the mapping application can open a capture interface that allows the user to utilize an image capture device of the user computing device 400. Additionally, or alternatively, the mapping application can display a first editing interface element 412. The first editing interface element 412 can prompt the user to edit the user-generated content 404 with image editing tools native to the mapping application. Additionally, or alternatively, the mapping application can display a second editing interface element 414. The second editing interface element 414 can prompt the user to edit the user-generated content 404 with image editing tools of other applications or the operating system of the user computing device 400.

In some implementations, the tools indicated by the first editing interface element 412 and the second editing interface element 414 can be tools that leverage machine-learned models. In particular, the tools may leverage content-specific machine-learned models implemented as described with regards to the content-specific model handler 214 of FIG. 2.

Returning to FIG. 3B, at 332 the user computing device can obtain second user-generated content. For example, at 332A, the user computing device can process the first user-generated content with the second content-specific machine-learned model to obtain the second user-generated content if the user computing device identified the second content-specific machine-learned model at operation 326. For another example, at 332B, the user computing device can receive second user-generated content generated via the user modifying the first user-generated content with the tools provided to the user at operation 330A. For yet another example, at 332C, the user computing device can receive second user-generated content captured by the user based on the prompt provided to the user at operation 330B.

At 334, the user computing device can process the second user-generated content with the first content-specific machine-learned model to obtain a second quality metric. Specifically, the user computing device can process the second user-generated content with the same content-specific machine-learned model that processed the first user-generated content to obtain the first quality metric. In this manner, the user computing device can determine whether the second user-generated content is higher quality than the first user-generated content.

At 336, the user computing device can determine whether to provide the second user-generated content based on the second quality metric. If the user computing device determines to refrain from providing the second user-generated content (e.g., due to the second quality metric being lower than a threshold, etc.), the user computing device can return to operation 326 to obtain third user-generated content. Alternatively, at 338, the user computing device can provide the second user-generated content if the user computing device determines to provide the second user-generated content at operation 336.

Figure 5:
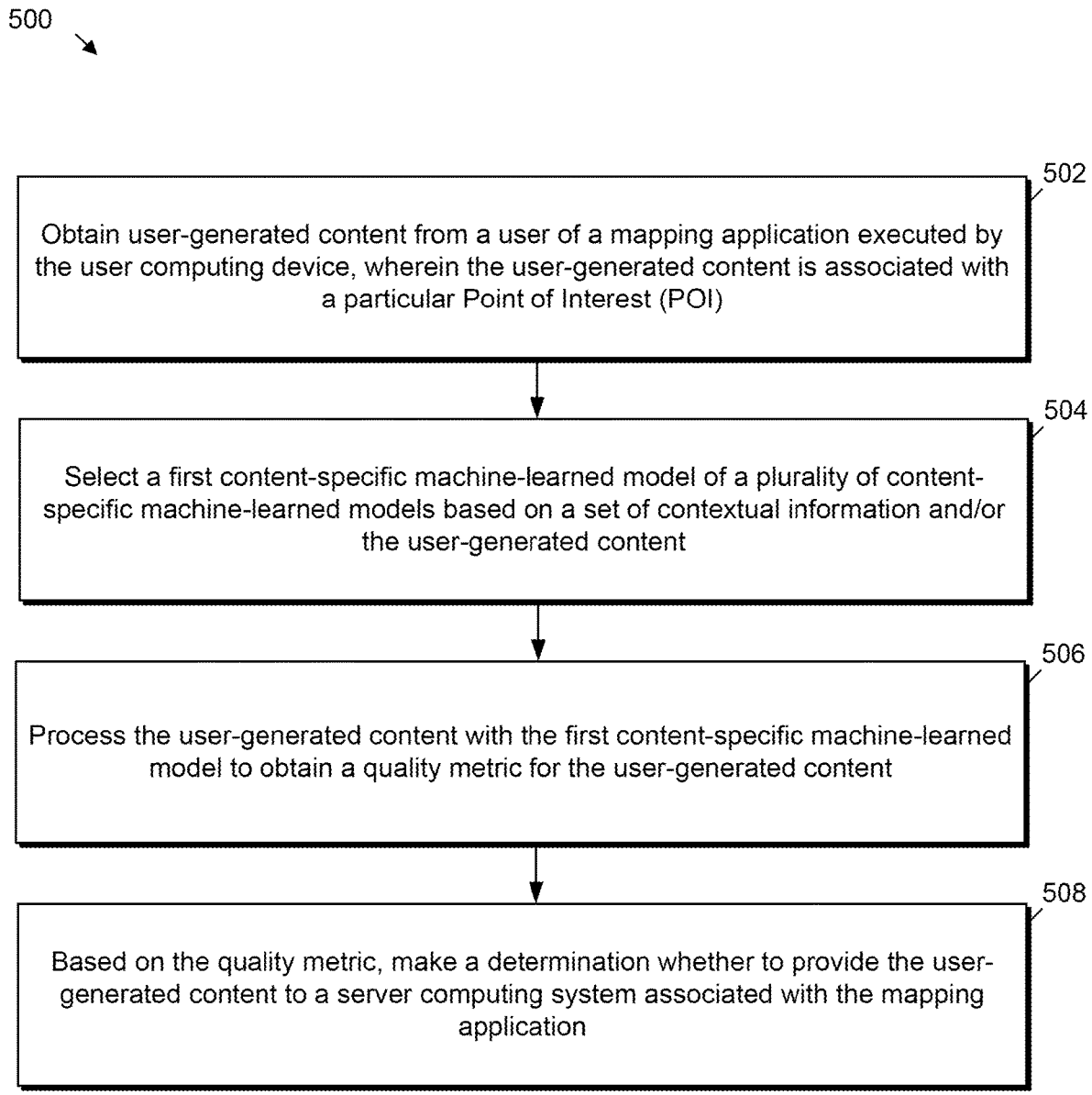
FIG. 5 is a flowchart for a method for performing on-device content-specific model orchestration for optimizing user-generated content according to some implementations of the present disclosure.

FIG. 5 is a flowchart for a method 500 for performing on-device content-specific model orchestration for optimizing user-generated content according to some implementations of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a user computing device can obtain user-generated content from a user of a mapping application executed by the user computing device. The user-generated content is associated with a particular POI.

At 504, the user computing device can select a first content-specific machine-learned model of a plurality of content-specific machine-learned models based on the user-generated content and/or a set of contextual information. The set of contextual information can include at least one of a location of the particular POI, information descriptive of the particular POI, or information descriptive of the user-generated content.

At 506, the user computing device can process the user-generated content with the first content-specific machine-learned model to obtain a quality metric for the user-generated content.

At 508, the user computing device can, based on the quality metric, make a determination whether to provide the user-generated content to a server computing system associated with the mapping application. In some implementations, making the determination whether to provide the user-generated content can include making the determination to provide the user-generated content to the server computing system based on the quality metric for the user-generated content being greater than a threshold quality metric. The user computing device can provide the user-generated content to the server computing system associated with the mapping application.

Alternatively, in some implementations, making the determination whether to provide the user-generated content can include making a determination to refrain from providing the user-generated content to the server computing system based on the quality metric for the user-generated content being less than or equal to a threshold quality metric. In some implementations, the user computing device can display, via an associated display device, information indicative of the determination to refrain from providing the user-generated content to the server computing system associated with the quality metric.

In some implementations, the user computing device can obtain a second user-generated content. The user computing device can process the second user-generated content with the first content-specific machine-learned model to obtain a second quality metric for the second user-generated content. Based on the second quality metric, the user computing device can make a determination to provide the second user-generated content to the server computing system associated with the mapping application. The user computing device can provide the second user-generated content to the server computing system.

In some implementations, obtaining the second user-generated content includes displaying, via the associated display device, one or more interface elements associated with a tool operable to modify the user-generated content. The user computing device can obtain, from the user, a user input that modifies the user-generated content with the tool to generate the second user-generated content.

In some implementations, obtaining the second user-generated content can include displaying an interface element indicative of an input device that was previously used to generate the user-generated content. The user computing device can obtain, via the input device, the second user-generated content.

In some implementations, selecting the first content-specific machine-learned model of the plurality of content-specific machine-learned models can include determining a first content type of a plurality of first content types associated with the user-generated content based on the set of contextual information. Based on the first content type, the user computing device can select the first content-specific machine-learned model of the plurality of content-specific machine-learned models. The first content-specific machine-learned model can be trained to process user-generated content of the first content type.

In some implementations, determining the first content type of the plurality of first content types associated with the user-generated content can include processing one or more model inputs with a machine-learned content classifier model to obtain a model output indicative of the first content type. The one or more model outputs can include at least one of the user-generated content, information derived from the user-generated content, or at least some of the set of contextual information.

In some implementations, selecting the first content-specific machine-learned model further can include obtaining one or more model updates for the first content-specific machine-learned model from the server computing system associated with the mapping application, and applying the one or more model updates to the first content-specific machine-learned model.

In some implementations, selecting the first content-specific machine-learned model can include obtaining the first content-specific machine-learned model from the server computing system associated with the mapping application. The user computing device can store the first content-specific machine-learned model to a local storage device of the user computing device. The user computing device can instantiate an instance of the first content-specific machine-learned model.

In some implementations, storing the first content-specific machine-learned model to the local storage device of the user computing device can include determining that a quantity of available space on the local storage device is less than a size of the first content-specific machine-learned model. The user computing device can remove a second content-specific machine-learned model from the local storage device.

In some implementations, the user computing device can add a data entry descriptive of first content-specific machine-learned model to a data store associated with the mapping application.

In some implementations, the user computing device can determine to unload the first content-specific machine-learned model from active memory of the user computing device; and can unload the first content-specific machine-learned model.

In some implementations, selecting the first content-specific machine-learned model can include selecting the first content-specific machine-learned model of the plurality of content-specific machine-learned models based on the information descriptive of the POI. The information descriptive of the POI can include information indicating a certain category of POIs associated with the particular POI. The first content-specific machine-learned model can be trained to process image data depicting POIs of the certain category of POIs.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:
1. A computer-implemented method, comprising:
obtaining, by a user computing device comprising one or more processor devices, user-generated content from a user of an application executed by the user computing device, wherein the user-generated content is associated with a particular Point of Interest (POI);
selecting, by the user computing device, a first content-specific machine-learned model of a plurality of content-specific machine-learned models based on the user-generated content and/or a set of contextual infor- mation, wherein the set of contextual information comprises at least one of:
a location of the particular POI;
information descriptive of the particular POI; or
information descriptive of the user-generated content; and processing, by the user computing device, the user-generated content with the first content-specific machine-learned model to obtain a quality metric for the user-generated content; and based on the quality metric, making, by the user computing device, a determination whether to provide the user-generated content to a server computing system associated with the application.

2. The computer-implemented method of claim 1, wherein the application comprises a mapping application.

3. The computer-implemented method of claim 1, wherein making the determination whether to provide the user-generated content comprises:
making, by the user computing device, a determination to provide the user-generated content to the server computing system based on the quality metric for the user-generated content being greater than a threshold quality metric; and
providing, by the user computing device, the user-generated content to the server computing system associated with the application.

4. The computer-implemented method of claim 1, wherein making the determination whether to provide the user-generated content comprises:
making, by the user computing device, a determination to refrain from providing the user-generated content to the server computing system based on the quality metric for the user-generated content being less than or equal to a threshold quality metric.

5. The computer-implemented method of claim 4, wherein the method further comprises:
displaying, by the user computing device via an associated display device, information indicative of the determination to refrain from providing the user-generated content to the server computing system associated with the quality metric.

6. The computer-implemented method of claim 5, wherein the method further comprises:
obtaining, by the user computing device, a second user-generated content;
processing, by the user computing device, the second user-generated content with the first content-specific machine-learned model to obtain a second quality metric for the second user-generated content;
based on the second quality metric, making, by the user computing device, a determination to provide the second user-generated content to the server computing system associated with the application; and
providing, by the user computing device, the second user-generated content to the server computing system.

7. The computer-implemented method of claim 6, wherein obtaining the second user-generated content comprises:
displaying, by the user computing device via the associated display device, one or more interface elements associated with a tool operable to modify the user-generated content; and
obtaining, by the user computing device from the user, a user input that modifies the user-generated content with the tool to generate the second user-generated content.

8. The computer-implemented method of claim 6, wherein obtaining the second user-generated content comprises:
displaying, by the user computing device, an interface element indicative of an input device that was previously used to generate the user-generated content; and
obtaining, by the user computing device via the input device, the second user-generated content.

9. The computer-implemented method of claim 1, wherein selecting the first content-specific machine-learned model of the plurality of content-specific machine-learned models comprises:
determining, by the user computing device, a first content type of a plurality of first content types associated with the user-generated content based on the set of contextual information; and
based on the first content type, selecting, by the user computing device, the first content-specific machine-learned model of the plurality of content-specific machine-learned models, wherein the first content-specific machine-learned model is trained to process user-generated content of the first content type.

10. The computer-implemented method of claim 9, wherein determining the first content type of the plurality of first content types associated with the user-generated content comprises:
processing, by the user computing device, one or more model inputs with a machine-learned content classifier model to obtain a model output indicative of the first content type, wherein the one or more model inputs comprises at least one of:
the user-generated content;
information derived from the user-generated content; or
at least some of the set of contextual information.

11. The computer-implemented method of claim 1, wherein selecting the first content-specific machine-learned model further comprises:
obtaining, by the user computing device, one or more model updates for the first content-specific machine-learned model from the server computing system associated with the application; and
applying, by the user computing device, the one or more model updates to the first content-specific machine-learned model.

12. The computer-implemented method of claim 1, wherein selecting the first content-specific machine-learned model further comprises:
obtaining, by the user computing device, the first content-specific machine-learned model from the server computing system associated with the application; and
storing, by the user computing device, the first content-specific machine-learned model to a local storage device of the user computing device; and
instantiating, by the user computing device, an instance of the first content-specific machine-learned model.

13. The computer-implemented method of claim 12, wherein storing the first content-specific machine-learned model to the local storage device of the user computing device comprises:
determining, by the user computing device, that a quantity of available space on the local storage device is less than a size of the first content-specific machine-learned model; and
removing, by the user computing device, a second content-specific machine-learned model from the local storage device.

14. The computer-implemented method of claim 12, wherein the method further comprises adding, by the user computing device, a data entry descriptive of the first content-specific machine-learned model to a data store associated with the application.

15. The computer-implemented method of claim 12, wherein the method further comprises:
   determining, by the user computing device, to unload the first content-specific machine-learned model from active memory of the user computing device; and
   unloading, by the user computing device, the first content-specific machine-learned model.

16. The computer-implemented method of claim 1, wherein selecting the first content-specific machine-learned model comprises:
   selecting, by the user computing device, the first content-specific machine-learned model of the plurality of content-specific machine-learned models based on the information descriptive of the particular POI, wherein the information descriptive of the particular POI comprises information indicating a certain category of POIs associated with the particular POI; and
   wherein the first content-specific machine-learned model is trained to process image data depicting POIs of the certain category of POIs.

17. A user computing device, comprising:
   one or more processing devices; and
      one or more computer-readable media storing instructions that, when executed by the one or more processing devices, cause the one or more processing devices to perform operations, the operations comprising:
      obtaining user-generated content from a user of an application executed by the user computing device, wherein the user-generated content is associated with a particular Point of Interest (POI);
      selecting a first content-specific machine-learned model of a plurality of content-specific machine-learned models based on the user-generated content and/or a set of contextual information, wherein the set of contextual information comprises at least one of:
         a location of the particular POI;
         information descriptive of the particular POI; or
         information descriptive of the user-generated content; and
      processing the user-generated content with the first content-specific machine-learned model to obtain a quality metric for the user-generated content; and
      based on the quality metric, making a determination whether to provide the user-generated content to a server computing system associated with the application.

18. The user computing device of claim 17, wherein making the determination whether to provide the user-generated content comprises:
   making a determination to provide the user-generated content to the server computing system based on the quality metric for the user-generated content being greater than a threshold quality metric; and
   providing the user-generated content to the server computing system associated with the application.

19. The user computing device of claim 17, wherein making the determination whether to provide the user-generated content comprises:
   making a determination to refrain from providing the user-generated content to the server computing system based on the quality metric for the user-generated content being less than or equal to a threshold quality metric.

20. One or more non-transitory computer-readable media storing instructions that, when executed by one or more processing devices of a user computing device, cause the one or more processing devices to perform operations, the operations comprising: obtaining user-generated content from a user of an application executed by the user computing device, wherein the user-generated content is associated with a particular Point of Interest (POI); selecting a first content-specific machine-learned model of a plurality of content-specific machine-learned models based on the user-generated content and/or a set of contextual information, wherein the set of contextual information comprises at least one of: a location of the particular POI; information descriptive of the particular POI; or information descriptive of the user-generated content; and processing the user-generated content with the first content-specific machine-learned model to obtain a quality metric for the user-generated content; and based on the quality metric, making a determination whether to provide the user-generated content to a server computing system associated with the application.

\* \* \* \* \*